UNITED STATES PATENT OFFICE.

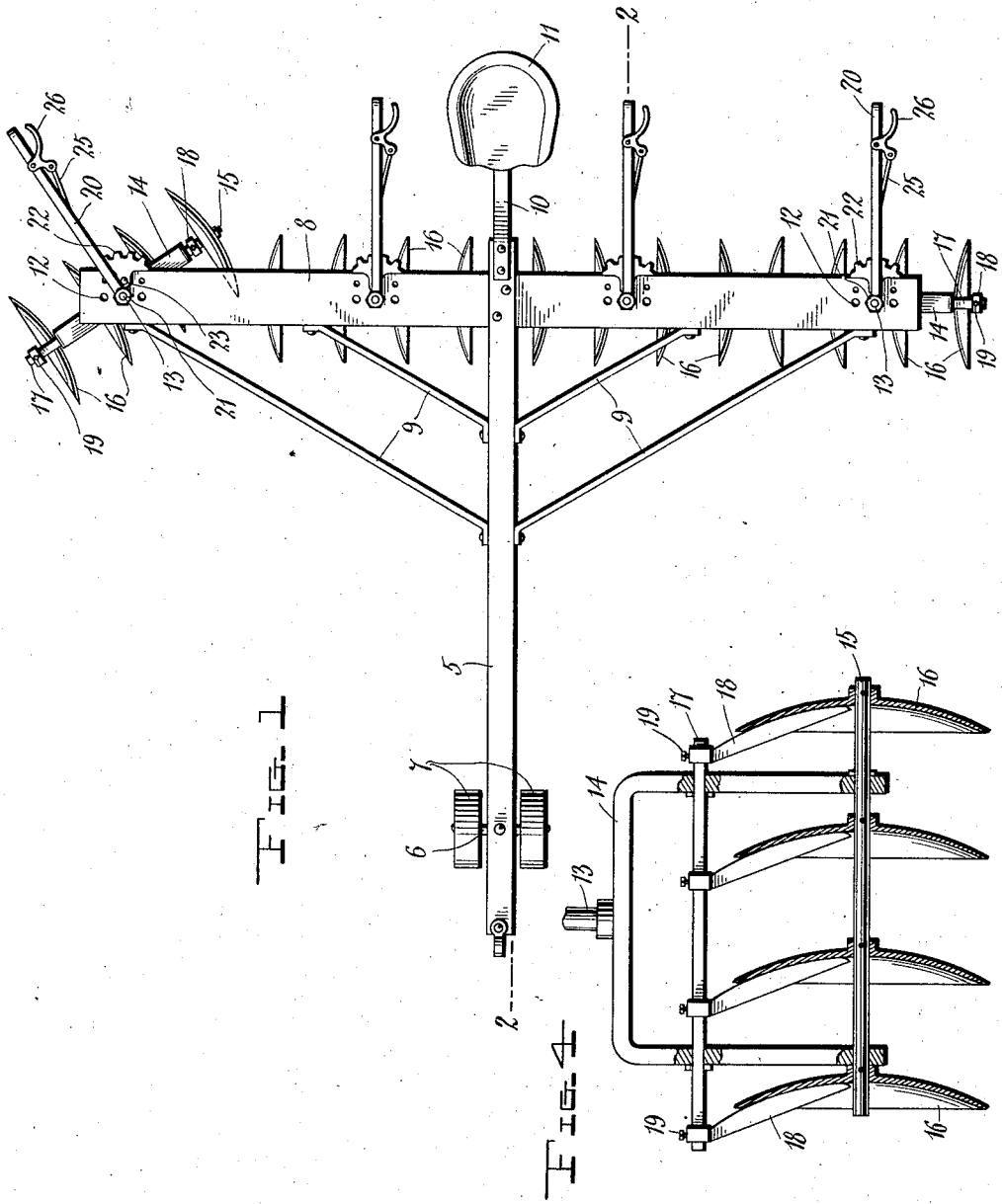

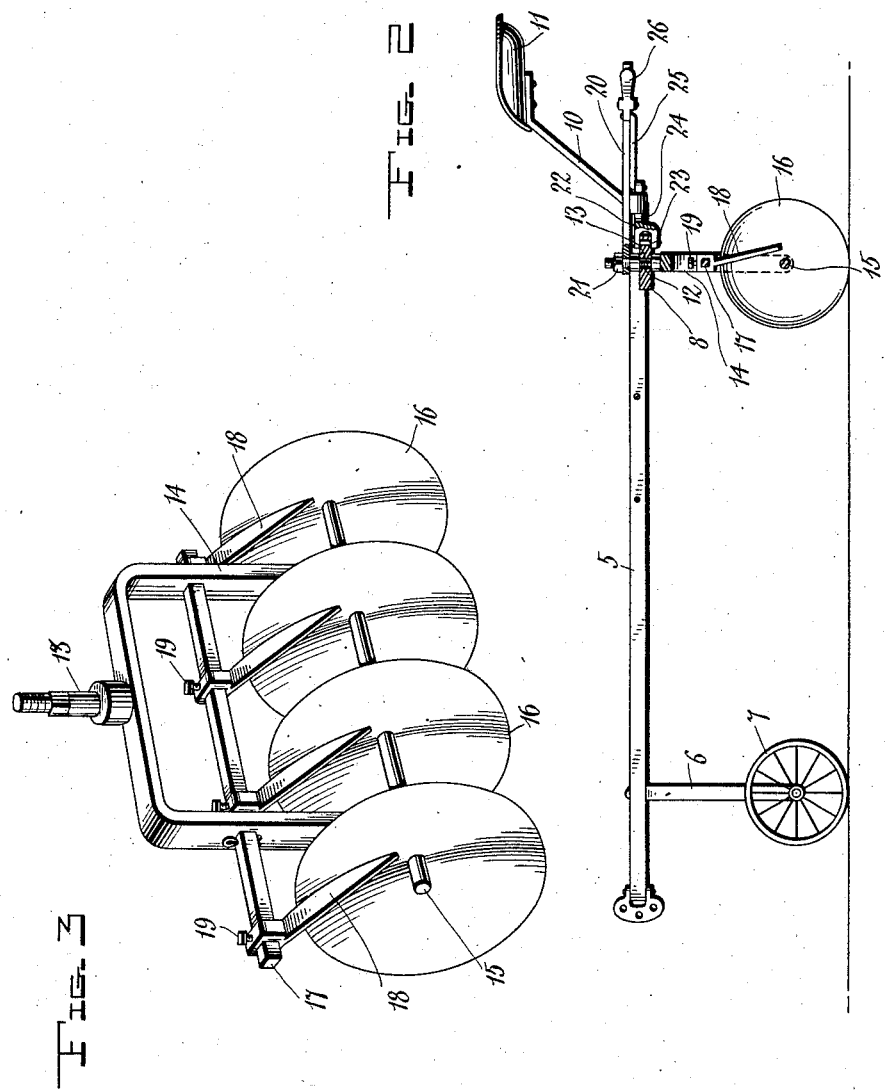

AUGUST H. MICHEL, OF KENNEY, ILLINOIS.

DISK HARROW.

997,312. Specification of Letters Patent. Patented July 11, 1911.

Application filed November 17, 1910. Serial No. 592,870.

*To all whom it may concern:*

Be it known that I, AUGUST H. MICHEL, a citizen of the United States, residing at Kenney, in the county of Dewitt, State of Illinois, have invented certain new and useful Improvements in Disk Harrows; and I do hereby declare the following to be a full, clear, and exact description of the invention, such as will enable others skilled in the art to which it appertains to make and use the same.

This invention relates to improvements in disk harrows and the leading object of the invention is to provide an improved disk harrow comprising a supporting beam having connected thereto a series of pivoted yokes, each of which is provided with a shaft supporting a number of harrow disks and a shaft supporting a number of scraper arms projecting angularly therefrom to engage the harrow disks. The improved harrow is also provided with means for adjustably holding the disk supporting yokes so that the disk shafts can be arranged at different angles to the supporting beam.

With the above and other objects in view the invention consists in certain constructions, combinations and arrangements of parts, clearly described in the following specification and clearly illustrated in the accompanying drawings, in which:—

Figure 1 is a top plan view of the improved harrow. Fig. 2 is a longitudinal sectional view taken on the line 2—2 of Fig. 1. Fig. 3 is a perspective view showing one of the disk supporting yokes detached. Fig. 4 is a sectional view showing the manner of mounting the disks on the shaft and the particular angular construction of the scrapers supported above the disks.

Referring to the accompanying drawings, 5 denotes the draft beam which is supported at its forward end by the depending yoke 6 which carries the ground wheels 7 on its lower ends. The rear end of the yoke is bolted to the transversely disposed supporting beam 8 and said supporting beam is braced to the draft beam by diagonal brace rods 9. On the rear end of the draft beam 5 the seat post 10 is mounted, and on the upper end of said seat post the seat 11 is secured.

The supporting beam 8 is adapted to hold a number of disk carrying yokes, and is formed with longitudinally spaced openings 12 which are adapted to receive the upstanding pivots 13 of the disk supporting yokes 14, which are rigidly connected with said pivots. The openings 12 are arranged in groups of three or more at equi-distant places in the supporting beam 8 so that the disk carrying yokes 14 can be adjusted on said supporting beam. Each yoke 14 supports a shaft 15 on its lower ends and on said shaft the concave convex harrow disks 16 are arranged. Above the shaft 15 a rod or bar 17 is secured to the legs of the yoke 14 and on said rod or bar the disk scrapers 10 are secured the lower ends of said scrapers projecting angularly from the rod or bar 17 to engage the concave surfaces of the disks 16, and each of said scrapers being provided with said screws 19 whereby they can be adjusted on the rod or bar 17 when desired.

The pivots 13 of the disk supporting yokes 14 extend above the upper face of the beam 8 and the forward ends of the adjusting levers 20 are mounted on said pivots and secured in place thereon by nuts 21. On the supporting beam 8 adjacent the pivots 13 a series of segments 22 are secured by the bolts 23 which are adapted to be passed through either of the openings 13 formed adjacent to the openings 12. The segments 22 are formed with bifurcated forward ends which are placed astride the rear edge of the supporting beam 8, and said segments are engaged by the pawls 24 secured to the forward ends of the rods 25, the outer ends of which are pivoted to the pivoted handles 26 carried by the lever 20. By moving the levers 20 horizontally after the pawls 24 have been disengaged from the segments 22 the angular relation of the disk supporting yokes 14 may be varied with respect to the supporting beam 8.

I claim:—

A disk harrow comprising a draft beam and a supporting bar, angular braces connecting the supporting beam to the draft beam, a series of disk supporting yokes provided with pivots extending through the draft beam at equidistant points thereon, levers mounted on the pivots and extending rearwardly of the supporting beam, segments having bifurcated forward ends placed astride the supporting beam adjacent the levers, means for adjustably securing the segments in place on the supporting beam and pawls pivoted to the levers adapted to engage the segments.

In testimony whereof, I affix my signature, in presence of two witnesses.

AUGUST H. MICHEL.

Witnesses:
 A. N. ROWE,
 I. B. ROWE.

---

Copies of this patent may be obtained for five cents each, by addressing the "Commissioner of Patents, Washington, D. C."